(12) United States Patent
Zhang

(10) Patent No.: US 10,701,158 B2
(45) Date of Patent: Jun. 30, 2020

(54) CONTROL METHOD OF WEARABLE APPARATUS AND RELATED APPARATUSES

(71) Applicant: Guangdong Oppo Mobile Telecommunications Corp., Ltd., Dongguan, Guangdong (CN)

(72) Inventor: Haiping Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/295,927

(22) Filed: Mar. 7, 2019

(65) Prior Publication Data
US 2019/0335000 A1 Oct. 31, 2019

(30) Foreign Application Priority Data

Apr. 26, 2018 (CN) .......................... 2018 1 0388478

(51) Int. Cl.
*H04L 29/08* (2006.01)
*G08C 17/02* (2006.01)
(Continued)

(52) U.S. Cl.
CPC ............ *H04L 67/125* (2013.01); *G08C 15/06* (2013.01); *G08C 17/02* (2013.01); *H04L 5/0033* (2013.01);
(Continued)

(58) Field of Classification Search
CPC . H04L 67/125; H04L 12/2816; H04L 5/0033; H04L 2012/2841;
(Continued)

(56) References Cited

U.S. PATENT DOCUMENTS 7,925,029 B2 * 4/2011 Hollemans ........... H04R 1/1041
381/151
9,860,625 B2 * 1/2018 Tachibana ............ H04R 1/1041
(Continued)

FOREIGN PATENT DOCUMENTS

CN 101895799 A 11/2010
CN 103634717 A 3/2014
(Continued)

OTHER PUBLICATIONS

Extended European search report issued in corresponding European application No. 19162123.4 dated Jun. 4, 2019.
(Continued)

*Primary Examiner* — Marisol Figueroa
(74) *Attorney, Agent, or Firm* — Young Basile Hanlon & MacFarlane, P.C.

(57) ABSTRACT

A control method of a wearable apparatus and related apparatuses are provided. A wearable apparatus includes a first wearable device and a second wearable device. The first wearable device and the second wearable device each include a control circuit and an input-output circuit. The wearable apparatus is coupled with an electronic apparatus. Control circuit of the first wearable device is configured to control input-output circuit of the first wearable device and to send, via the input-output circuit of the first wearable device, a first control instruction to the electronic apparatus, whereby the electronic apparatus executes the first control instruction. Control circuit of the second wearable device is configured to control input-output circuit of the second wearable device and to send, via the input-output circuit of the second wearable device, a second control instruction to the electronic apparatus, whereby the electronic apparatus executes the second control instruction.

6 Claims, 7 Drawing Sheets

(51) Int. Cl.
*H04L 5/00* (2006.01)
*H04L 12/28* (2006.01)
*G08C 15/06* (2006.01)
*H04Q 9/04* (2006.01)

(52) U.S. Cl.
CPC ........... *H04L 12/2816* (2013.01); *H04Q 9/04* (2013.01); *H04L 2012/2841* (2013.01); *H04L 2012/2849* (2013.01)

(58) Field of Classification Search
CPC . H04L 2012/2849; G08C 15/06; G08C 17/02; H04Q 9/04
See application file for complete search history.

(56) References Cited

U.S. PATENT DOCUMENTS

| | | | |
|---|---|---|---|
| 2016/0212536 A1 | 7/2016 | Park et al. | |
| 2017/0094389 A1 | 3/2017 | Saulsbury et al. | |
| 2018/0008194 A1 | 1/2018 | Boesen | |
| 2018/0063313 A1* | 3/2018 | Lee | H04M 1/576 |
| 2018/0070166 A1* | 3/2018 | Howell | H04R 1/1016 |
| 2018/0132031 A1* | 5/2018 | Seo | A61B 5/6802 |
| 2019/0015045 A1* | 1/2019 | Li | A61B 5/6824 |
| 2019/0246196 A1* | 8/2019 | Han | G06F 3/0481 |

FOREIGN PATENT DOCUMENTS

| | | | | |
|---|---|---|---|---|
| CN | 104914999 A | 9/2015 | | |
| CN | 105468152 A | 4/2016 | | |
| CN | 105491469 A | 4/2016 | | |
| CN | 105721694 A | 6/2016 | | |
| CN | 105955488 A | 9/2016 | | |
| CN | 106453863 A | 2/2017 | | |
| CN | 106658256 A | 5/2017 | | |
| CN | 107465972 A | 12/2017 | | |
| CN | 107707811 A | 2/2018 | | |
| EP | 1615465 A2 * | 1/2006 | ........... | H04R 1/1041 |
| EP | 3291573 A1 | 3/2018 | | |

OTHER PUBLICATIONS

International search report issued in corresponding international application No. PCT/CN2019/077195 dated May 29, 2019.

* cited by examiner

CONTROL METHOD OF WEARABLE APPARATUS AND RELATED APPARATUSES

CROSS-REFERENCE TO RELATED APPLICATION(S)

This application claims priority to and the benefit of Chinese Application Patent Serial No. 201810388478.4, filed on Apr. 26, 2018, the entire disclosure of which is hereby incorporated by reference.

TECHNICAL FIELD

This disclosure relates to the field of electronic technology, and more particularly to a control method of a wearable apparatus and related apparatuses.

BACKGROUND

Wearable apparatuses refer to portable apparatuses that are worn directly on users' body or integrated with users' clothes or accessories. The wearable apparatuses may be wireless headphones, smart watches, glasses, earrings, buttons, helmets, or the like. Specifically, the wearable apparatus can be an apparatus that adopts a wireless technology such as Bluetooth® to connect an electronic apparatus to provide functions such as a talk function and an audio playback function.

SUMMARY

A control method of a wearable apparatus and related apparatuses are provided.

In a first aspect of the present disclosure, a wearable apparatus is provided. The wearable apparatus includes a first wearable device and a second wearable device. The first wearable device and the second wearable device each include a control circuit and an input-output circuit. The wearable apparatus is coupled with an electronic apparatus. Control circuit of the first wearable device is configured to control input-output circuit of the first wearable device and to send, via the input-output circuit of the first wearable device, a first control instruction to the electronic apparatus, whereby the electronic apparatus executes the first control instruction. Control circuit of the second wearable device is configured to control input-output circuit of the second wearable device and to send, via the input-output circuit of the second wearable device, a second control instruction to the electronic apparatus, whereby the electronic apparatus executes the second control instruction.

In a second aspect of the present disclosure, an electronic apparatus is provided. The electronic apparatus includes a control circuit and an input-output circuit. The electronic apparatus is coupled with a wearable apparatus. The wearable apparatus includes a first wearable device and a second wearable device. The control circuit is configured to receive, via the input-output circuit, a first control instruction from the first wearable device and to execute the first control instruction. The control circuit is configured to receive, via the input-output circuit, a second control instruction from the second wearable device and to execute the second control instruction.

In a third aspect of the present disclosure, a control method of a wearable apparatus is provided. The method includes the following. A first wearable device of the wearable apparatus sends a first control instruction to an electronic apparatus, whereby the electronic apparatus executes the first control instruction, where the electronic apparatus is coupled with the wearable apparatus and the wearable apparatus further includes a second wearable device. The second wearable device sends a second control instruction to the electronic apparatus, whereby the electronic apparatus executes the second control instruction.

BRIEF DESCRIPTION OF DRAWINGS

To illustrate technical solutions embodied by implementations of the present disclosure or by the related art more clearly, the following briefly introduces the accompanying drawings required for describing the implementations or the related art. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Figure 1:
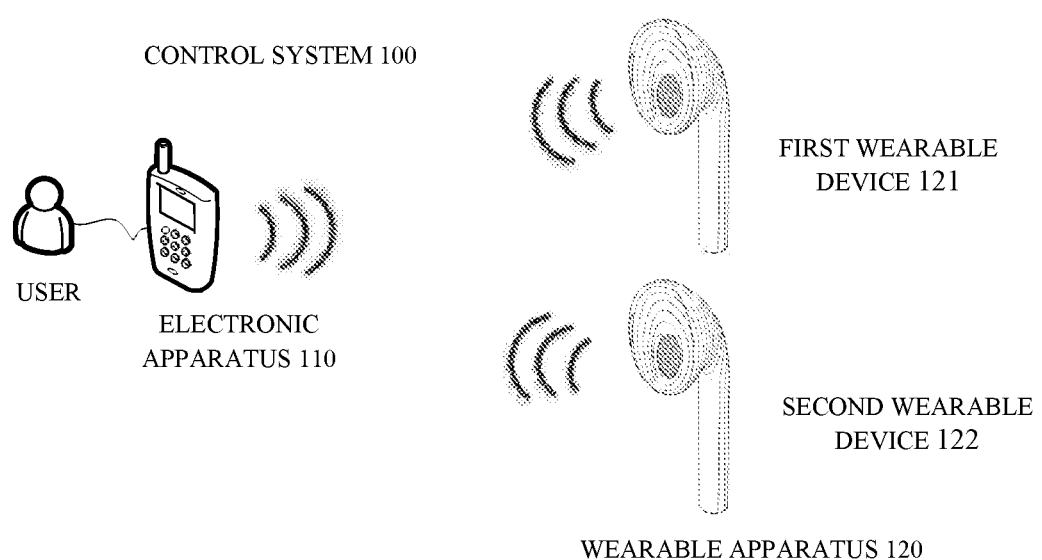
FIG. 1 is a schematic structural diagram illustrating a control system according to an implementation of the present disclosure.

In order for those skilled in the art to better understand technical solutions of the present disclosure, technical solutions in implementations of the present disclosure will be described clearly and completely hereinafter with reference to the accompanying drawings described in the previous chapter. Apparently, the described implementations are merely some rather than all implementations of the present disclosure. All other implementations obtained by those of ordinary skill in the art based on the implementations of the present disclosure without creative efforts shall fall within the protection scope of the present disclosure.

The following will give a detailed description.

The terms "first", "second", "third", and the like used in the specification, the claims, and the accompanying drawings of the present disclosure are used to distinguish different objects rather than describe a particular order. In addition, the terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be also included.

The term "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

Hereinafter, implementations of the disclosure will be described in detail.

According to an implementation of the disclosure, a wearable apparatus is provided. The wearable apparatus includes a first wearable device and a second wearable device. The first wearable device and the second wearable device each include a control circuit and an input-output circuit. The wearable apparatus is coupled with an electronic apparatus. Control circuit of the first wearable device is configured to control input-output circuit of the first wearable device and to send, via the input-output circuit of the first wearable device, a first control instruction to the electronic apparatus, whereby the electronic apparatus executes the first control instruction. Control circuit of the second wearable device is configured to control input-output circuit of the second wearable device and to send, via the input-output circuit of the second wearable device, a second control instruction to the electronic apparatus, whereby the electronic apparatus executes the second control instruction.

According to an implementation of the disclosure, an electronic apparatus is provided. The electronic apparatus includes a control circuit and an input-output circuit. The electronic apparatus is coupled with a wearable apparatus. The wearable apparatus includes a first wearable device and a second wearable device. The control circuit is configured to receive, via the input-output circuit, a first control instruction from the first wearable device and to execute the first control instruction. The control circuit is configured to receive, via the input-output circuit, a second control instruction from the second wearable device and to execute the second control instruction.

According to an implementation of the disclosure, a control method of a wearable apparatus is provided. The method includes the following. A first wearable device of the wearable apparatus sends a first control instruction to an electronic apparatus, whereby the electronic apparatus executes the first control instruction, where the electronic apparatus is coupled with the wearable apparatus and the wearable apparatus further includes a second wearable device. The second wearable device sends a second control instruction to the electronic apparatus, whereby the electronic apparatus executes the second control instruction.

Implementations of the disclosure will be detailed below with reference to the accompanying drawings.

FIG. 1 is a schematic structural diagram illustrating a control system 100 according to an implementation of the present disclosure. In this implementation, the control system 100 includes an electronic apparatus 110 and a wearable apparatus 120. The wearable apparatus 120 is coupled with the electronic apparatus 110 via a wireless technology such as Bluetooth®, infrared, or the like. The wearable apparatus 120 includes a first wearable device 121 and a second wearable device 122. Assuming that the wearable apparatus 120 is a wireless headphone, the first wearable device 121 and the second wearable device 122 each correspond to one of a pair of earplugs of the wireless headphone accordingly.

"Electronic apparatus" in implementations of the disclosure may include various apparatus with wireless communication functions such as handheld apparatuses, on-board apparatuses, and computing apparatuses, or other processing apparatuses connected to a wireless modem, as well as various forms of user equipment (UE), mobile stations (MS), terminal apparatuses, etc.

The wearable apparatuses may include wireless headphones, smart bands, smart earrings, smart buttons, smart rings, smart glasses, helmets, etc., and the wearable apparatus can support functions such as incoming call answering, audio playback, audio collection, and control of electronic apparatuses.

The operating principle of the control system 100 provided in implementations of the disclosure is as follows. The first wearable device 121 sends a first control instruction to the electronic apparatus 110, and the electronic apparatus 110 executes the first control instruction after receiving the first control instruction. The second wearable device 122 sends a second control instruction to the electronic apparatus 110, and the electronic apparatus 110 executes the second control instruction after receiving the second control instruction.

Assuming that the above wearable apparatus is a wireless headphone. Most wireless headphones only support functions of voice talks and audio playback currently. According to implementations of the present disclosure, the wearable apparatus includes two wearable devices, and the electronic apparatus coupled with the wearable apparatus can be controlled by the user via the two wearable devices, thereby improving intelligence of control of the electronic apparatus by the wearable apparatus.

Figure 2:
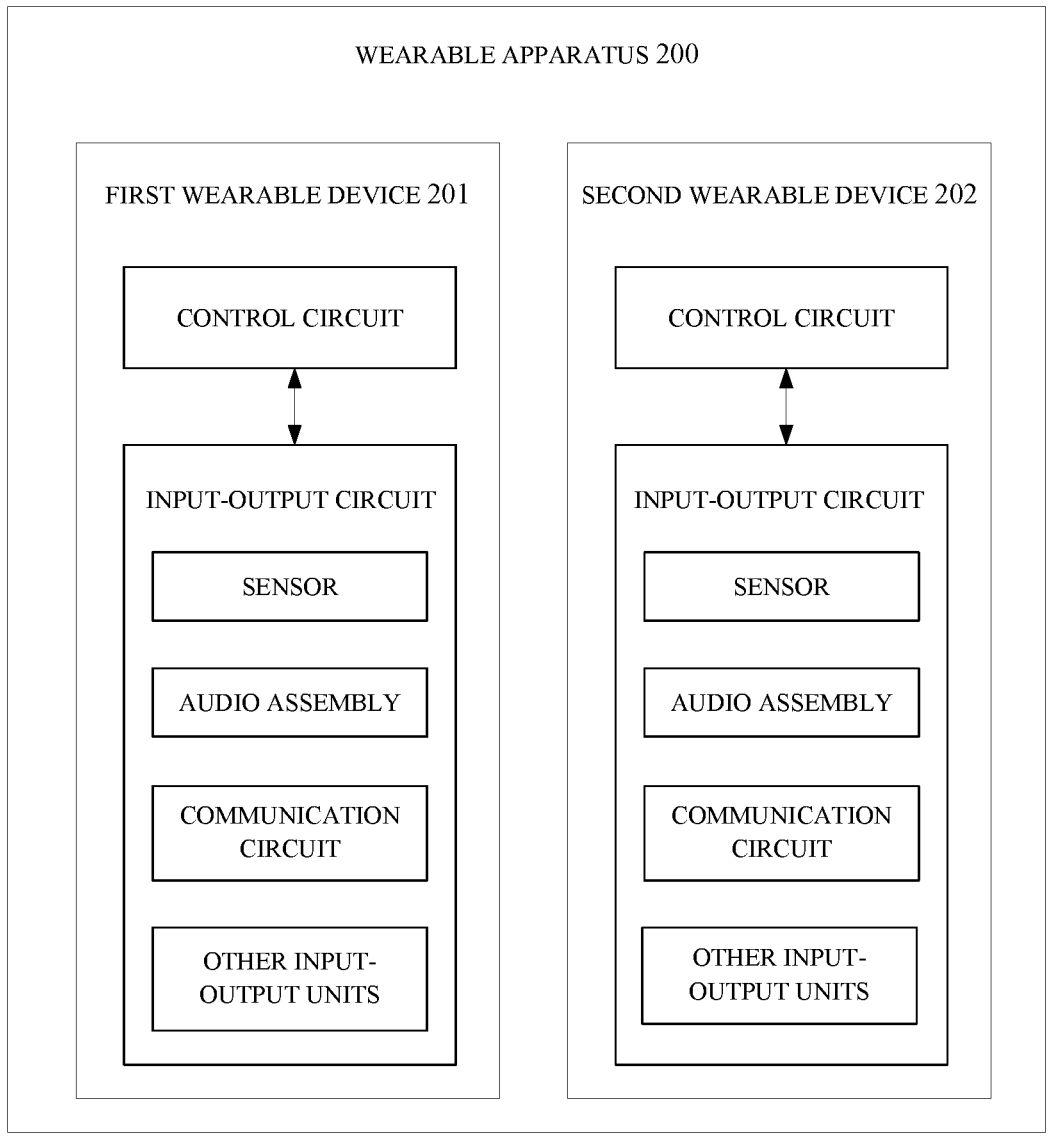
FIG. 2 is a schematic structural diagram illustrating a wearable apparatus according to an implementation of the present disclosure.

Based on the control system above, FIG. 2 is a schematic structural diagram illustrating a wearable apparatus 200 according to an implementation of the present disclosure. The wearable apparatus 200 includes a first wearable device 201 and a second wearable device 202. The first wearable device 201 and the second wearable device 202 each include a control circuit and an input-output circuit.

Control circuit of the first wearable device 201 is configured to control input-output circuit of the first wearable device 201 and to send, via the input-output circuit of the first wearable device 201, a first control instruction to an electronic apparatus, whereby the electronic apparatus executes the first control instruction. Control circuit of the second wearable device 202 is configured to control input-output circuit of the second wearable device 202 and to send, via the input-output circuit of the second wearable device 202, a second control instruction to the electronic apparatus, whereby the electronic apparatus executes the second control instruction.

The control circuits of the first wearable device 201 and the second wearable device 202 may each include a processor and a memory. The memory may be a hard disk drive, a non-transitory memory (e.g., a flash memory or other electronically programmable read only memories used to form solid-state drives, etc.), a transitory memory (e.g., a static random access memory or a dynamic random access memory), and the like, and implementations of the present disclosure are not limited thereto. The processor is configured to control operations of the wearable apparatus 200. Operations controlled by the processor can be implemented based on one or more microprocessors, microcontrollers, digital signal processors, baseband processors, power management units, audio codec chips, application-specific integrated circuits, display driver integrated circuits, and the like.

The processor can be configured to connect various parts of the whole wearable apparatus 200 through various interfaces and lines to run or execute software programs and/or modules stored in the memory, such as an application for turning on/off a sensor, an application for establishing a communication connection with an electronic apparatus, an application for disconnecting a communication connection with an electronic apparatus, an application for communicating with an electronic apparatus, an audio playback application, and the like. The software programs may be used to execute some control operations, such as an operation for starting a sensor (specifically, starting a gesture sensor, starting a pressure sensor, etc.), an operation for transmitting a control instruction to the electronic apparatus, other functions of the wearable apparatus 200, and implementations of the present disclosure are not particularly restricted.

The input-output circuit of the first wearable device 201 or the second wearable device 202 is configured to achieve data input and data output of the wearable apparatus 200, that is, to allow the wearable apparatus 200 to receive data from an external apparatus and also to allow the wearable apparatus 200 to output data to an external apparatus. The input-output circuits of the first wearable device 201 and the second wearable device 202 may each include at least one sensor. The sensor of the input-output circuit may include a gesture sensor, an acceleration sensor, an infrared proximity sensor, a heart rate sensor, a body temperature sensor, a tap-signal acquiring device, and other sensors. The tap-signal acquiring device includes at least one of a capacitive sensor, a pressure sensor, a camera, and the like.

In one implementation, the control circuit of the first wearable device 201 configured to send the first control instruction is configured to receive a first input on the first wearable device 201 from a user via at least one sensor of the first wearable device 201, and to send the first control instruction in response to the first input. The control circuit of the second wearable device 202 configured to send the second control instruction is configured to receive a second input on the second wearable device 202 from the user via at least one sensor of the second wearable device 202, and to send the second control instruction in response to the second input.

The foregoing at least one sensor can also be arranged in other components of the first wearable device and/or the second wearable device other than the input-output circuit, the application is not particularly limited, as long as the at least one sensor can be configured to receive actions on the wearable apparatus from a user. Specifically, a first input on the first wearable device is received via at least one sensor of the first wearable device, similarly, a second input on the second wearable device is received via at least one sensor of the second wearable device. The first input relates to at least one of a first gesture, a first tap signal, a first touch signal, and a first keyword. The second input relates to at least one of a second gesture, a second tap signal, a second touch signal, and a second keyword. The tap signal can be received via the tap-signal acquiring device for example. As another example, a touch signal can be received via the pressure sensor.

The first control instruction is sent in response to the first input received and the second control instruction is sent in response to the second input received, which will be described in detail below in conjunction with the control circuit.

The input-output circuits of the first wearable device 201 and the second wearable device 202 may each include an audio assembly. The audio assembly is configured to provide the wearable apparatus 200 with audio input and output functions. The audio assembly of the wearable apparatus 200 may include speakers, microphones, buzzers, tone generators, and other assemblies for generating and detecting sound. Voices can be received via the audio assembly and parsed to obtain keywords.

The input-output circuits of the first wearable device 201 and the second wearable device 202 may each include a communication circuit. The communication circuit can be configured to provide the wearable apparatus 200 with the ability to communicate with external apparatuses. As an implementation, the input-output circuit includes analog-and-digital input-output interface circuits and wireless communication circuits based on radio frequency signals and/or optical signals. The wireless communication circuit of the input-output circuit may include a radio frequency transceiver circuit, a power amplifier circuit, a low-noise amplifier, a switch, and a filter. As an example, the wireless communication circuit of the input-output circuit includes a circuit for supporting near field communication (NFC) by transmitting and receiving near field coupled electromagnetic signals. Specifically, the input-output circuit includes an NFC antenna and an NFC transceiver.

The input-output circuits of the first wearable device 201 and the second wearable device 202 may further include other input-output units. The other input-output units include but not limited to buttons, joysticks, click wheels, scroll wheels, touch pads, keypads, keyboards, cameras, light-emitting diodes (LEDs), and other status indicators.

The wearable apparatus 200 may further include a battery (not illustrated) for supplying electrical energy to the wearable apparatus 200.

The first control instruction and the second control instruction may be configured to instruct the electronic apparatus to control an application(s) of the electronic apparatus, the following will be discussed separately.

The following first describes the case where different applications of the electronic apparatus are controlled.

In one implementation, the first control instruction and the second control instruction are configured to instruct the electronic apparatus to control different applications of the electronic apparatus, where the different applications include a first application and a second application.

In one implementation, the first control instruction is configured to instruct the electronic apparatus to control a preset function of the first application and the second control instruction is configured to instruct the electronic apparatus to control the preset function of the second application. Specifically, the wearable apparatus 200 receives a first input on the first wearable device 201 from a user via at least one sensor of the first wearable device 201 and sends the first control instruction in response to the first input, so that a specific function of the first application is controlled. The wearable apparatus 200 receives a second input on the second wearable device 202 from the user via at least one sensor of the second wearable device 202 and sends the second control instruction in response to the second input, so that the specific function of the second application is controlled. The specific function is an opening function for example.

It should be noted that, the first wearable device 201 and the second wearable device 202 can be provided with the same sensor or different sensors. The disclosure is not limit the type and number of the sensors provided.

A particular example will be described below taking a wireless headphone equipped with tap-signal acquiring devices as an example, but a real application thereof will not be limited to a tap-signal acquiring device.

As an example, assuming that the electronic apparatus is a smart phone, the wearable apparatus 200 is a wireless headphone, the first wearable device 201 corresponds to the left earplug, and the second wearable device 202 corresponds to the right earplug. The left earplug and the right earplug are each equipped with a tap-signal acquiring device. The left earplug is configured to receive a first tap-signal via a tap-signal acquiring device of the left earplug, and to send the first control instruction in response to the first tap-signal, so that an audio and video application of the electronic apparatus is opened. The right earplug is configured to receive a second tap-signal via a tap-signal acquiring device of the right earplug, and to send the second control instruction in response to the second tap-signal, so that a payment application of the electronic apparatus is opened.

In one implementation, the first control instruction is configured to instruct the electronic apparatus to control a first function of the first application and the second control instruction is configured to instruct the electronic apparatus to control a second function of the second application. Specifically, the wearable apparatus 200 receives a first input on the first wearable device 201 from a user via at least one sensor of the first wearable device 201 and sends the first control instruction in response to the first input, so that the first function of the first application is controlled. The wearable apparatus 200 receives a second input on the second wearable device 202 from the user via at least one sensor of the second wearable device 202 and sends the second control instruction in response to the second input, so that the second function of the second application is controlled.

The following describes the case where the same application of the electronic apparatus is controlled.

In one implementation, the first control instruction and the second control instruction are configured to instruct the electronic apparatus to control an application of the electronic apparatus.

In one implementation, the first control instruction and the second control instruction are configured to instruct the electronic apparatus to control the same function of the application. Specifically, the wearable apparatus 200 receives a first input on the first wearable device 201 from a user via at least one sensor of the first wearable device 201 and sends the first control instruction in response to the first input, so that a specific function of the application is controlled. The wearable apparatus 200 receives a second input on the second wearable device 202 from the user via at least one sensor of the second wearable device 202 and sends the second control instruction in response to the second input, so that the specific function of the application is controlled. The specific function is a closing function for example.

In one implementation, the first control instruction is configured to instruct the electronic apparatus to control a first function of the application and the second control instruction is configured to instruct the electronic apparatus to control a second function of the application. Specifically, the wearable apparatus 200 receives a first input on the first wearable device 201 from a user via at least one sensor of the first wearable device 201 and sends the first control instruction in response to the first input, so that the first function of the application is controlled. The wearable apparatus 200 receives a second input on the second wearable device from the user via at least one sensor of the second wearable device and sends the second control instruction in response to the second input, so that the second function of the application is controlled.

As mentioned above, the first input can be understood as a first action or a first operation and can include at least one of a first gesture, a first tap signal, a first touch signal, and a first keyword. The second input can be understood as a second action or a second operation and can include at least one of a second gesture, a second tap signal, a second touch signal, and a second keyword.

In the wearable apparatus, a correspondence relationship between the first input and the first control instruction as well as a correspondence relationship between the second input and the second control instruction can be preset in advance. Based on the correspondence relationship, when a specific input such as a specific gesture is received, the wearable apparatus can decide which kind of first control instruction to be sent to the electronic apparatus.

According to implementations of the disclosure, the first control instruction and the second control instruction may be configured to instruct the electronic apparatus to open or close an application, to control display of an application, to control volume, to adjust screen-brightness, to unlock or lock a screen, to accept or reject a call, and the like, which is not particularly limited.

As can be seen, in implementations of the present disclosure, the wearable apparatus includes two wearable devices, and the electronic apparatus coupled with the wearable apparatus can be controlled by the user via the two wearable devices, which can improve intelligence of control of the electronic apparatus by the wearable apparatus.

Figure 3:
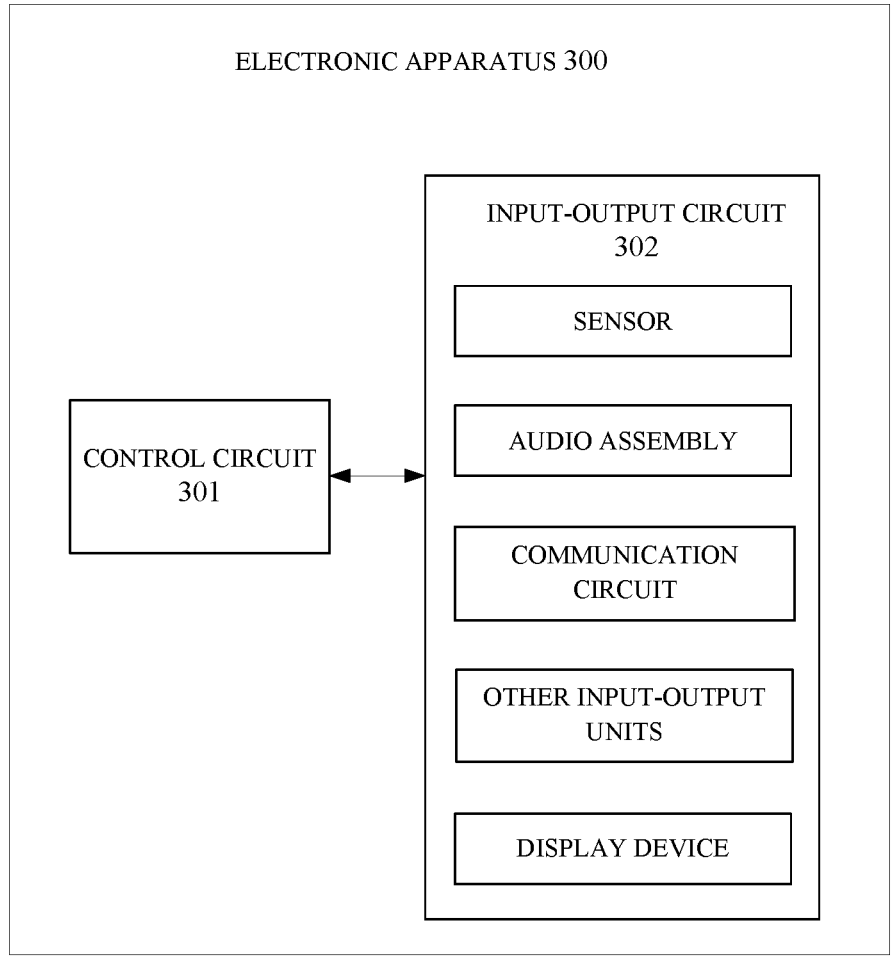
FIG. 3 is a schematic structural diagram illustrating an electronic apparatus according to an implementation of the present disclosure.

Based on the control system above, FIG. 3 is a schematic structural diagram illustrating an electronic apparatus 300 according to an implementation of the present disclosure. As illustrated in FIG. 3, the electronic apparatus 300 includes a control circuit 301 and an input-output circuit 302. The input-output circuit 302 is coupled with the control circuit 301. The electronic apparatus 300 is coupled with a wearable apparatus including a first wearable device and a second wearable device. The control circuit 301 is configured to receive, via the input-output circuit 302, a first control instruction from the first wearable device and to execute the first control instruction. The control circuit 301 is configured to receive, via the input-output circuit 302, a second control instruction from the second wearable device and to execute the second control instruction.

The control circuit 301 may include a processor and a memory. The memory may be a hard disk drive, a non-transitory memory (e.g., a flash memory or other electronically programmable read only memories used to form solid-state drives, etc.), a transitory memory (e.g., a static random access memory or a dynamic random access memory), and the like, and implementations of the present disclosure are not limited thereto. The processor is configured to control operations of the electronic apparatus 300. Operations controlled by the processor can be implemented based on one or more microprocessors, microcontrollers, digital signal processors, baseband processors, power management units, audio codec chips, application-specific integrated circuits, display driver integrated circuits, and the like.

The processor can be configured to connect various parts of the electronic apparatus 300 through various interfaces and lines to run or execute software programs and/or modules stored in the memory, such as an Internet browsing application, a voice over Internet protocol (VOIP) phone call application, an email application, a media playback application, an operating system function, and the like. The software programs may be used to execute some control operations, such as camera-based image collection, ambient light sensor-based ambient light measurements, proximity sensor-based proximity state measurements, information display function based on status indicators such as status indicators of LEDs, touch sensor-based touch event detection, functions associated with displaying information on multiple (e.g., layered) displays, operations associated with implementing wireless communication functions, operations associated with collecting and generating audio signals, control operations associated with collecting and processing button press event data, and other functions of the electronic apparatus 300, and implementations of the present disclosure are not particularly restricted.

The input-output circuit 302 is configured to achieve data input and data output of the electronic apparatus 300, that is, to allow the electronic apparatus 300 to receive data from an external apparatus and also to allow the electronic apparatus 300 to output data to an external apparatus. The input-output circuit 302 may include a sensor. The sensor of the input-output circuit 302 may include an ambient light sensor, an optical or capacitive proximity sensor, a touch sensor (e.g., based on an optical touch sensor and/or a capacitive touch sensor, where the touch sensor may be a part of a touch display or may be used independently as a touch sensor structure), an acceleration sensor, and other sensors.

The input-output circuit 302 may further include one or more display devices, such as a display. The display device may be one or a combination of a liquid crystal display, an organic LED display, an electronic ink display, a plasma display, and displays based on other display technologies. As an implementation, the display device includes an array of touch sensors (i.e., the display device can be a touch display screen). The touch sensor may be a capacitive touch sensor formed by an array of transparent touch sensor electrodes (e.g., indium tin oxide (ITO) electrodes), or may be a touch sensor formed based on other touch technologies, such as acoustic touch, pressure sensitive touch, resistance touch, optical touch, and the like, and implementations of the present disclosure are not particularly restricted.

The input-output circuit 302 may further include an audio assembly. The audio assembly is configured to provide the electronic apparatus 300 with audio input and output functions. The audio assembly of the electronic apparatus 300 may include speakers, microphones, buzzers, tone generators, and other assemblies for generating and detecting sound.

The input-output circuit 302 may further include a communication circuit. The communication circuit can be configured to provide the electronic apparatus 300 with the ability to communicate with external apparatuses. As an implementation, the communication circuit includes analog-and-digital input-output interface circuits and wireless communication circuits based on radio frequency signals and/or optical signals. The wireless communication circuit of the communication circuit may include a radio frequency transceiver circuit, a power amplifier circuit, a low-noise amplifier, a switch, a filter, and an antenna. As an example, the wireless communication circuit of the communication circuit includes a circuit for supporting NFC by transmitting and receiving near field coupled electromagnetic signals. Specifically, the communication circuit includes an NFC antenna and an NFC transceiver. As another implementation, the communication circuit further includes transceivers and antennas of cellular telephone, transceiver circuits and antennas of wireless local area network, and the like.

The input-output circuit 302 may further include other input-output units. The other input-output units include but not limited to buttons, joysticks, click wheels, scroll wheels, touch pads, keypads, keyboards, cameras, LEDs, and other status indicators.

The electronic apparatus 300 may further include a battery (not illustrated) for supplying electrical energy to the electronic apparatus 300.

The following first describes the case where different applications of the electronic apparatus 300 are controlled.

In one implementation, the control circuit 301 is configured to control different applications of the electronic apparatus 300 according to the first control instruction and the second control instruction, where the different applications include a first application and a second application.

In one implementation, the control circuit 301 is configured to control a preset function of the first application according to the first control instruction and to control the preset function of the second application according to the second control instruction.

In one implementation, the control circuit 301 is configured to control a first function of the first application according to the first control instruction and to control a second function of the second application according to the second control instruction.

The following describes the case where the same application of the electronic apparatus 300 is controlled.

In one implementation, the control circuit 301 is configured to control an application of the electronic apparatus 300 according to the first control instruction and the second control instruction.

In one implementation, the control circuit 301 is configured to control the same function of the application according to the first control instruction and the second control instruction.

In one implementation, the control circuit 301 is configured to control a first function of the application according to the first control instruction and to control a second function of the application according to the second control instruction.

As can be seen, according to implementations of the present disclosure, the electronic apparatus coupled with a wearable apparatus including two wearable devices can be controlled by the user via the two wearable devices, and it is possible to improve intelligence of controlling the electronic apparatus by the wearable apparatus.

It should be understood that functions of the foregoing components of the wearable apparatus 200 and the electronic apparatus 300 can be configured to implement parts or all of the methods described below.

Figure 4:
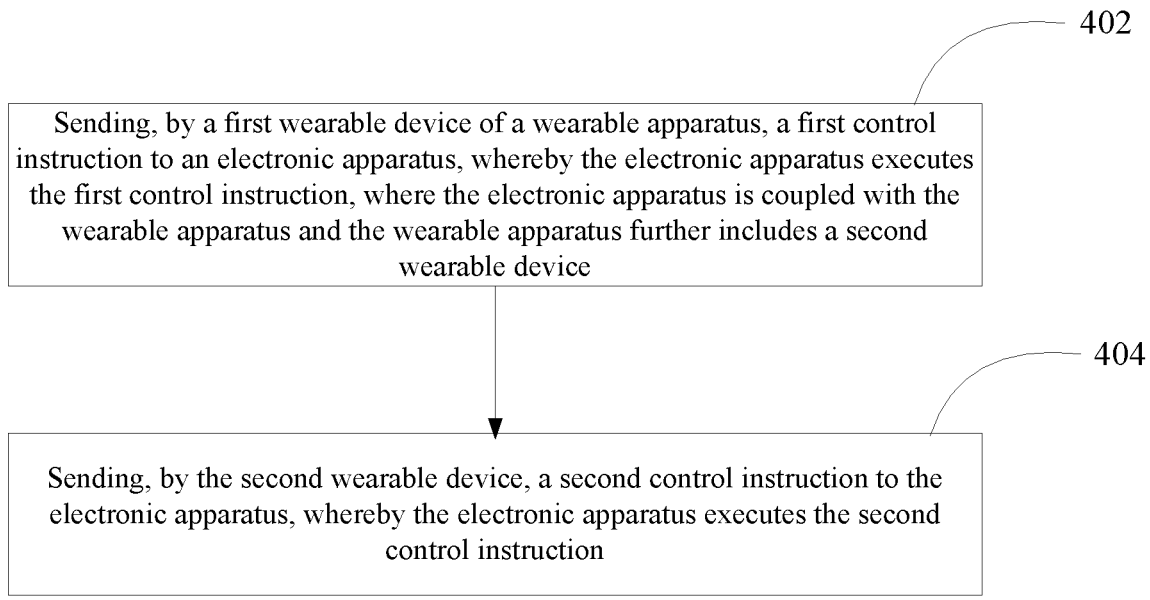
FIG. 4 is a schematic flowchart illustrating a control method of a wearable apparatus according to an implementation of the present disclosure.

FIG. 4 is a schematic flowchart illustrating a control method of a wearable apparatus according to an implementation of the present disclosure. As illustrated in FIG. 4, the control method begins at block 402.

At block 402, a first wearable device of the wearable apparatus sends a first control instruction to an electronic apparatus, whereby the electronic apparatus executes the first control instruction, where the electronic apparatus is coupled with the wearable apparatus and the wearable apparatus further includes a second wearable device.

At block 404, the second wearable device sends a second control instruction to the electronic apparatus, whereby the electronic apparatus executes the second control instruction.

In one implementation, the first control instruction is sent as follows. A first input on the first wearable device from a user is received via at least one sensor of the first wearable device, and the first control instruction is sent in response to the first input. The second control instruction is sent as follows. A second input on the second wearable device from the user is received via at least one sensor of the second wearable device, and the second control instruction is sent in response to the second input.

The first control instruction and the second control instruction may be configured to instruct the electronic apparatus to control an application(s) of the electronic apparatus, the following will be discussed separately.

In one implementation, the first control instruction and the second control instruction are configured to instruct the electronic apparatus to control different applications of the electronic apparatus, where the different applications include a first application and a second application.

In one implementation, the first control instruction and the second control instruction are configured to instruct the electronic apparatus to control an application of the electronic apparatus.

In implementations, the first control instruction or the second control instruction may be configured to instruct the electronic apparatus to open or close one application (the application may be a flashlight, an instant messaging application, a shopping application, a shooting application, an audio and video application, a payment application, etc.), to switch audio and video files currently played by one audio and video application, to switch one application to a second function from a first function, to zoom in content currently displayed by one application, to zoom out content currently displayed by one application, to control a shooting function of a shooting application to be switched on or off, and so on. Control operation described above is not particularly limited, and may be any control operation known in the art, and may be flexibly customized by persons skilled in the art.

For example, the first control instruction or the second control instruction is used for adjusting a volume of the electronic apparatus, such as turning up the volume of the electronic apparatus, turning down the volume of the electronic apparatus, or the like.

For example, the first control instruction or the second control instruction is used for adjusting brightness of a screen of the electronic apparatus, such as turning up the brightness of the screen of the electronic apparatus, turning down the brightness of the screen of the electronic apparatus, or the like.

For example, the first control instruction or the second control instruction is used for controlling the electronic apparatus to lock a screen of the electronic apparatus, to unlock the screen of the electronic apparatus, or to light up the screen of the electronic apparatus.

For example, the first control instruction or the second control instruction is used for controlling the electronic apparatus to make a call to a certain user or to hang up a current call.

For example, the first control instruction and the second control instruction are used for controlling different applications of the electronic apparatus. For example, the first control instruction is used to control APPA and the second control instruction is used to control APP B, where APP A is different from APP B.

For example, the first control instruction and the second control instruction are used for controlling different functions of a same application of the electronic apparatus. For example, the first control instruction is used to control a first function of APP A and the second control instruction is used to control a second function of APP A, where the first function is different from the second function.

As can be seen, according to implementations of the present disclosure, the wearable apparatus includes two wearable devices, and the electronic apparatus coupled with the wearable apparatus can be controlled by the user via the two wearable devices, thereby improving intelligence of controlling the electronic apparatus by the wearable apparatus.

The following first describes the case where different applications of the electronic apparatus are controlled.

In one implementation, the first control instruction is configured to instruct the electronic apparatus to control a preset function of the first application and the second control instruction is configured to instruct the electronic apparatus to control the preset function of the second application.

In one implementation, the first control instruction is configured to instruct the electronic apparatus to control a first function of the first application and the second control instruction is configured to instruct the electronic apparatus to control a second function of the second application.

The following describes the case where the same application of the electronic apparatus is controlled.

In one implementation, the first control instruction and the second control instruction are configured to instruct the electronic apparatus to control the same function of the application.

In one implementation, the first control instruction is configured to instruct the electronic apparatus to control a first function of the application and the second control instruction is configured to instruct the electronic apparatus to control a second function of the application.

As mentioned above, the first input can be understood as a first action or a first operation and can include at least one of a first gesture, a first tap signal, a first touch signal, and a first keyword. The second input can be understood as a second action or a second operation and can include at least one of a second gesture, a second tap signal, a second touch signal, and a second keyword.

The first gesture or the second gesture may be a gesture, a combination of multiple gestures, or the like, which is not limited herein.

The first tap signal or the second tap signal includes at least one of the number of times of tap, a tap frequency, and a tap operation. The tap operation may be a tap operation, or may be composed of multiple tap operations. The multiple tap operations each include a simple tap operation or a complicated tap operation, or the multiple tap operations include simple tap operations and complicated tap operations, which is not limited herein.

The first touch signal or the second touch signal includes at least one of the number of times of touch and a touch force.

The first keyword or the second keyword may be a keyword or multiple keywords, which is not limited herein. The first keyword or the second keyword for example may include the words "open", "close", "turn up", "turn down", "zoom in", "zoom out", "volume", "screen brightness", "one specific application name" (such as QQ®, WeChat®, Taobao®, Alipay®, Meitu Xiuxiu®, etc.), "lock screen", "unlock screen", "light-up screen", "shoot", "video", "next song", "next episode", "previous song", "previous episode", and so on. The first keyword or the second keyword is obtained by a wearable device parsing voices of a user after the voices are inputted.

The wearable devices (i.e., the first wearable device and the second wearable device) can acquire gestures via gesture sensors. As an example, a wearable device acquires a tap signal via a tap-signal acquiring device. As another example, a wearable device collects voices via an audio assembly and then parses the collected voice to obtain keywords. As still another example, a wearable device acquires a touch signal via a pressure sensor. These are listed here as examples and other types of sensors may also be applicable, if any, in a real application without departing from the scope of the disclosure.

A correspondence relationship between the first input and the first control instruction as well as a correspondence relationship between the second input and the second control instruction can be preset in advance. Based on the correspondence relationship, when a specific input such as a specific gesture is received, which kind of first control instruction to be sent to the electronic apparatus can be decided. In one possible implementation, the first input is a V-shaped gesture signal obtained by a gesture sensor and the second input is also a V-shaped gesture signal obtained by a gesture sensor, the first control instruction in response to the first input is different from the second control instruction in response to the second input, and a function instructed by the first control instruction is different from a function instructed by the second control instruction accordingly. In one possible implementation, the first input is a tap signal obtained by a tap-signal acquiring device and the second input is a touch signal obtained by a pressure sensor, the first control instruction in response to the first input is the same as the second control instruction in response to the second input, and the function instructed by the first control instruction is the same as the function instructed by the second control instruction accordingly. In other words, the control which the electronic device is instructed to conduct depends mainly on the correspondence relationships above. The disclosure is not limit the type and number of the sensors of the first wearable device and the second wearable device.

As an example, assuming that the wearable apparatus is a wireless headphone, and the wireless headphone has two earplugs, that is, a left earplug and a right earplug. The left earplug is worn by a user in a left ear and the right earplug is worn by the user in a right ear. When the left earplug recognizes an upward sliding gesture, the left earplug will send a control instruction to the electronic apparatus for turning up a volume of the electronic apparatus; when the left earplug recognizes a downward sliding gesture, the left earplug will send a control instruction to the electronic apparatus for turning down the volume of the electronic apparatus. Accordingly, when the right earplug recognizes the upward sliding gesture, the right earplug will send a control instruction to the electronic apparatus for turning up brightness of a screen of the electronic apparatus; when the right earplug recognizes the downward sliding gesture, the right earplug will send a control instruction to the electronic apparatus for turning down the brightness of the screen of the electronic apparatus.

As another example, assuming that the wearable apparatus is a wireless headphone, and the wireless headphone has two earplugs, that is, a left earplug (i.e., the first wearable device) and a right earplug (i.e., the second wearable device). The left earplug is worn by a user in a left ear and the right earplug is worn by the user in a right ear. When the left earplug recognizes that the left earplug is continuously touched by a finger of the user three times, the left earplug will send a control instruction to the electronic apparatus, where the control instruction is used for locking a screen of the electronic apparatus. Accordingly, when the right earplug recognizes that the right earplug is continuously touched by the finger of the user three times, the right earplug will send a control instruction to the electronic apparatus, where the control instruction is used for unlocking the screen of the electronic apparatus.

In one implementation, the method further includes the following before the first wearable device sends the first control instruction to the electronic apparatus. The first wearable device determines that the first wearable device is in a wearing state.

In one implementation, the method further includes the following before the second wearable device sends the second control instruction to the electronic apparatus. The second wearable device determines that the second wearable device is in a wearing state.

A wearable device, such as the first wearable device or the second wearable device, determines that the wearable device is in a wearing state as follows. An acceleration sensor is started. An infrared proximity sensor and a heart rate sensor are started in response to detecting, by the acceleration sensor, a put-in operation. When the infrared proximity sensor detects that the infrared proximity sensor is in a proximity state and heart rate detected by the heart rate sensor in a time period is within a human heart rate range, the wearable device determines that the wearable device is in the wearing state.

The acceleration sensor may be started by the wearable devices when the wearable devices are turned on, or acceleration sensor may be started by the wearable devices when the wearable devices are taken out of a box for receiving the wearable devices. As an implementation, in addition to receiving the wearable devices, the box can also charge the wearable devices.

The operating principle of the infrared proximity sensor provided herein is as follows. Whether the infrared proximity sensor is in a proximity state or in a distant state can be determined based on a time point at which infrared light is emitted and a time point at which the infrared light is reflected back. In implementations of the present disclosure, since the infrared proximity sensor is disposed on a housing of a wearable device, the infrared proximity sensor is occluded when the wearable device is worn by a user (i.e., in a wearing state). In this case, a time difference between a time point when the infrared proximity sensor emits infrared light and a time point when the infrared proximity sensor receives the infrared light is almost zero. At this time, the infrared proximity sensor is considered to be in a proximity state. On the other hand, when the wearable device is not worn by the user (i.e., in a non-wearing state), the infrared proximity sensor is not occluded. In this case, the time difference between the time point when the infrared proximity sensor emits the infrared light and the time point when the infrared proximity sensor receives the infrared light is far greater than zero. At this time, the infrared proximity sensor is considered to be in a distant state.

When a wearable device is stationary, acceleration detected by an acceleration sensor has a magnitude close to zero. On the other hand, when the wearable device is picked up, the acceleration detected by the acceleration sensor has a magnitude far greater than zero. Moreover, the acceleration detected by the acceleration sensor has a direction. As such, whether a put-in operation or a take-out operation has been detected can be determined based on the magnitude and direction of the acceleration detected by the acceleration sensor.

As an implementation, when acceleration continuously detected by an acceleration sensor in a first duration has a magnitude greater than zero and is in an upward direction, determine that the operation detected by the acceleration sensor is the put-in operation. The first duration is longer than or equal to a first threshold. On the other hand, when acceleration continuously detected by the acceleration sensor in a second duration has a magnitude greater than zero and is in a downward direction, determine that the operation detected by the acceleration sensor is the take-out operation. The second duration is longer than or equal to a second threshold.

Assuming that the wearable apparatus is a wireless headphone, the wearable devices are earplugs accordingly. Putting an earplug into an ear by a user is usually achieved as follows. The earplug is picked up by user's hand and then lifted up, and finally put into the ear. When the earplug is picked up by user's hand and then lifted up, acceleration detected by an acceleration sensor in a time period is in an upward direction and has a magnitude greater than zero. In this situation, it is considered that the put-in operation is detected. Taking the earplug out of the ear by the user is usually achieved as follows. The earplug is taken out of user' ear and then put down. When the earplug is put down, the acceleration detected by the acceleration sensor in the time period is in a downward direction and has a magnitude greater than zero. In this situation, it is considered that the take-out operation is detected.

It may be understood that, assuming that the wearable apparatus is a wireless headphone, the wearing state refers to a state where the wireless headphone is put in an ear of a user, and the non-wearing state refers to a state where the wireless headphone is taken out of the ear of the user.

Figure 5A:
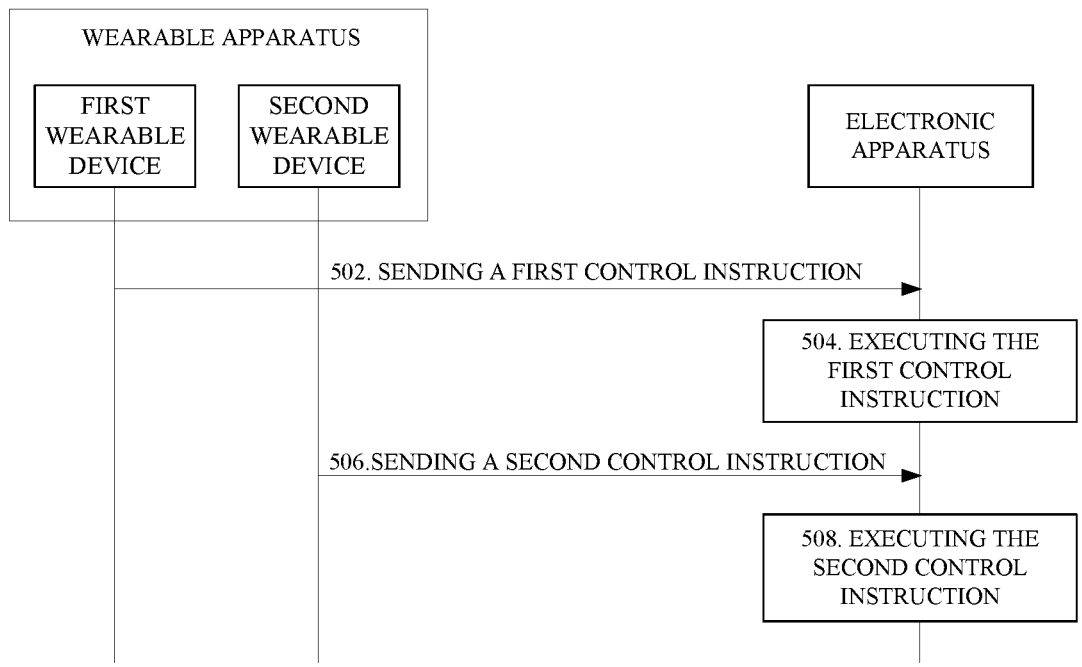
FIG. 5A is a schematic flowchart illustrating a control method according to an implementation of the present disclosure.

FIG. 5A is a schematic flowchart illustrating a control method according to an implementation of the present disclosure. The control method is applicable to the foregoing control system, the foregoing wearable apparatus, and the foregoing electronic apparatus. As illustrated in FIG. 5A, the control method begins at block 502.

At block 502, a first wearable device sends a first control instruction to an electronic apparatus.

At block 504, the electronic apparatus receives the first control instruction from the first wearable device and executes the first control instruction.

At block 506, a second wearable device sends a second control instruction to the electronic apparatus.

At block 508, the electronic apparatus receives the second control instruction from the second wearable device and executes the second control instruction.

Figure 5B:
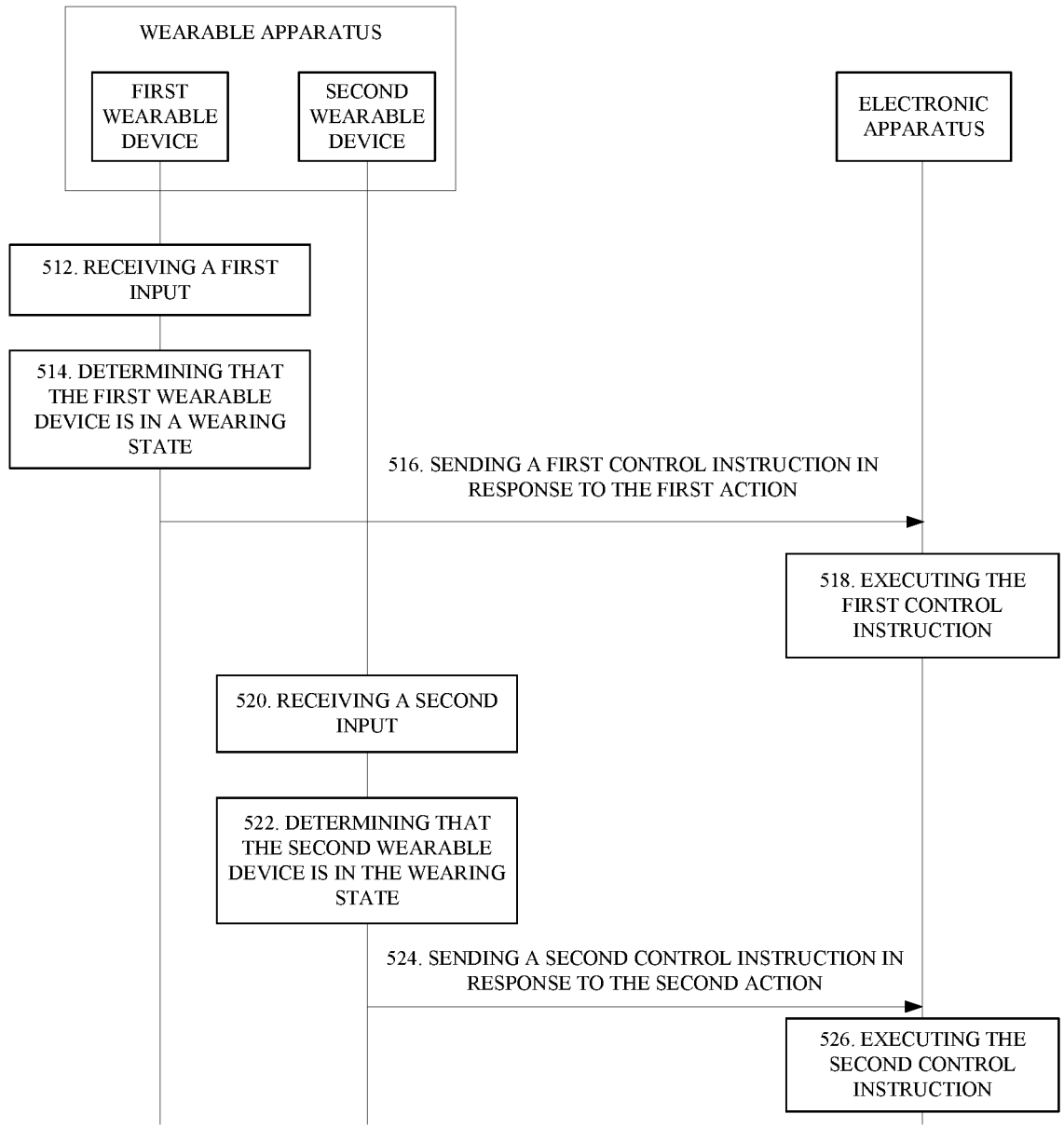
FIG. 5B is a schematic flowchart illustrating another control method according to an implementation of the present disclosure.

Another more detailed method is further provided according to an implementation of the present disclosure. The method is applicable to the foregoing control system, the foregoing wearable apparatus, and the foregoing electronic apparatus. As illustrated in FIG. 5B, the method begins at block 512.

At block 512, a first wearable device receives a first input, where the first input includes at least one of a first gesture, a first tap signal, a first touch signal, and a first keyword. The first input can be received or detected via an appropriate sensor, such as a gesture sensor, a tap-signal acquiring device, an audio assembly, and a pressure sensor.

At block 514, the first wearable device determines that the first wearable device is in a wearing state.

At block 516, the first wearable device sends a first control instruction to an electronic apparatus in response to the first input. The first control instruction is used to control an application or a function of an application.

At block 518, the electronic apparatus receives the first control instruction from the first wearable device and executes the first control instruction to control an application or a function of an application.

At block 520, a second wearable device receives a second input, where the second input includes at least one of a second gesture, a second tap signal, a second touch signal, and a second keyword.

At block 522, the second wearable device determines that the second wearable device is in the wearing state.

At block 524, the second wearable device sends a second control instruction to the electronic apparatus in response to the second input.

At block 526, the electronic apparatus receives the second control instruction from the second wearable device and executes the second control instruction.

It should be understood that the implementation process will not be detailed herein and reference may be made to the foregoing method implementations.

Figure 6:
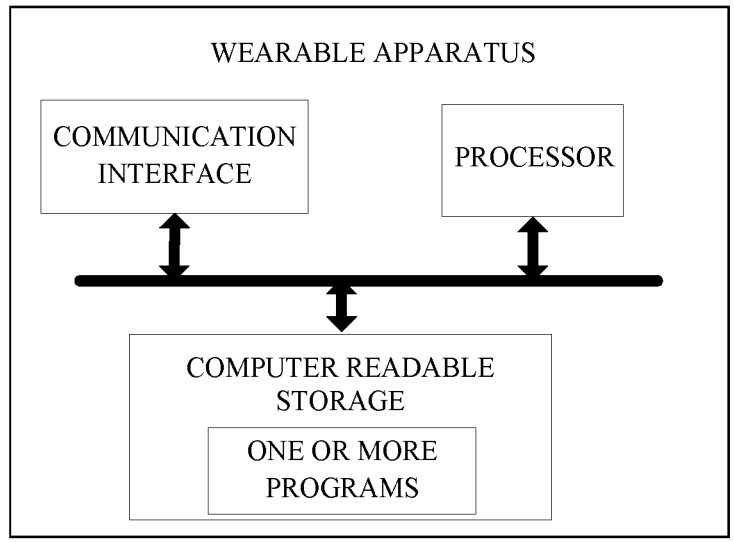
FIG. 6 is a schematic structural diagram illustrating another wearable apparatus according to an implementation of the present disclosure.

Consistent with the implementations illustrated in FIG. 4, FIG. 5A and FIG. 5B, FIG. 6 is a schematic structural diagram illustrating a wearable apparatus according to an implementation of the present disclosure. The wearable apparatus includes a first wearable device and a second wearable device. The wearable apparatus is coupled with an electronic apparatus. As illustrated in FIG. 6, the wearable apparatus includes at least one processor, a computer readable storage (for example, a memory), a communication interface, and one or more programs. The computer readable storage coupled to the at least one processor and storing the one or more programs thereon which, when executed by the at least one processor, causes the at least one processor to carry out following actions. The first wearable device sends a first control instruction to the electronic apparatus, whereby the electronic apparatus executes the first control instruction. The second wearable device sends a second control instruction to the electronic apparatus, whereby the electronic apparatus executes the second control instruction.

In one implementation, the at least one processor configured to carry out sending the first control instruction is configured to carry out following actions. A first input on the first wearable device from a user is received via at least one sensor of the first wearable device, and the first control instruction is sent in response to the first input. The at least one processor carry out sending the second control instruction is configured to carry out following actions. A second input on the second wearable device from the user is received via at least one sensor of the second wearable device, and the second control instruction is sent in response to the second input.

In one implementation, the first control instruction and the second control instruction are configured to instruct the electronic apparatus to control different applications of the electronic apparatus, where the different applications include a first application and a second application.

In one implementation, the first control instruction is configured to instruct the electronic apparatus to control a preset function of the first application, and the second control instruction is configured to instruct the electronic apparatus to control the preset function of the second application.

In one implementation, the first control instruction is configured to instruct the electronic apparatus to control a first function of the first application, and the second control instruction is configured to instruct the electronic apparatus to control a second function of the second application.

In one implementation, the first control instruction and the second control instruction are configured to instruct the electronic apparatus to control an application of the electronic apparatus.

In one implementation, the first control instruction and the second control instruction are configured to instruct the electronic apparatus to control the same function of the application.

In one implementation, the first control instruction is configured to instruct the electronic apparatus to control a first function of the application, and the second control instruction is configured to instruct the electronic apparatus to control a second function of the application.

It should be understood that the implementation process of the foregoing components will not be detailed herein and reference may be made to the foregoing method implementations.

Figure 7:
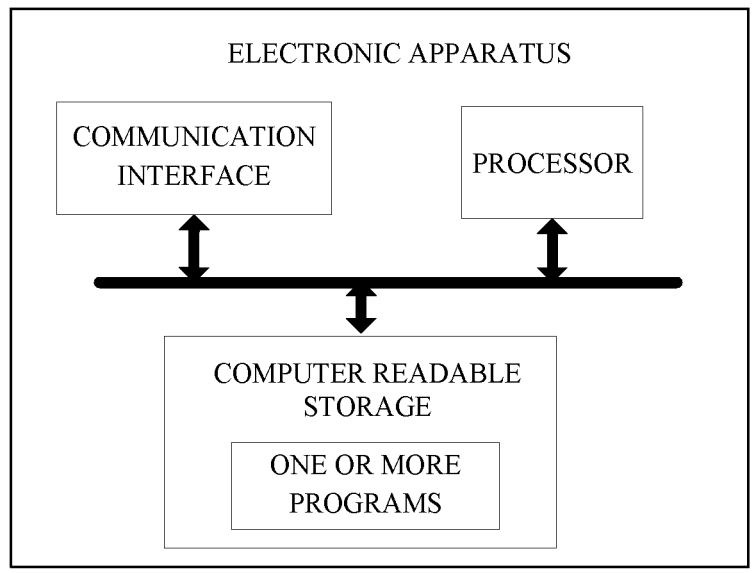
FIG. 7 is a schematic structural diagram illustrating another electronic apparatus according to an implementation of the present disclosure.

Consistent with the implementations illustrated in FIG. 5A and FIG. 5B, FIG. 7 is a schematic structural diagram illustrating an electronic apparatus according to an implementation of the present disclosure. The electronic apparatus is coupled with a wearable apparatus including a first wearable device and a second wearable device As illustrated in FIG. 7, the electronic apparatus includes at least one processor, a computer readable storage (for example, a memory), a communication interface, and one or more programs. The computer readable storage coupled to the at least one processor and storing the one or more programs thereon which, when executed by the at least one processor, causes the at least one processor to carry out following actions. A first control instruction is received from the first wearable device and the first control instruction is executed. A second control instruction is received from the second wearable device and the second control instruction is executed.

In one implementation, the at least one processor is further configured to carry out following actions. Different applications of the electronic apparatus are controlled according to the first control instruction and the second control instruction received, where the different applications include a first application and a second application.

In one implementation, in terms of controlling the different applications of the electronic apparatus, the at least one processor is configured to carry out following actions. A preset function of the first application is controlled according to the first control instruction. The preset function of the second application is controlled according to the second control instruction.

In one implementation, in terms of controlling the different applications of the electronic apparatus, the at least one processor is configured to carry out following actions. A first function of the first application is controlled according to the first control instruction. A second function of the second application is controlled according to the second control instruction.

In one implementation, the at least one processor is further configured to carry out following actions. An application of the electronic apparatus is controlled according to the first control instruction and the second control instruction received.

In one implementation, in terms of controlling the application of the electronic apparatus, the at least one processor is configured to carry out following actions. The same function of the application is controlled according to the first control instruction and the second control instruction.

In one implementation, in terms of controlling the application of the electronic apparatus, the at least one processor is configured to carry out following actions. A first function of the application is controlled according to the first control instruction. A second function of the application is controlled according to the second control instruction.

It should be understood that the implementation process of the foregoing components will not be detailed herein and reference may be made to the foregoing method implementations.

Figure 8:
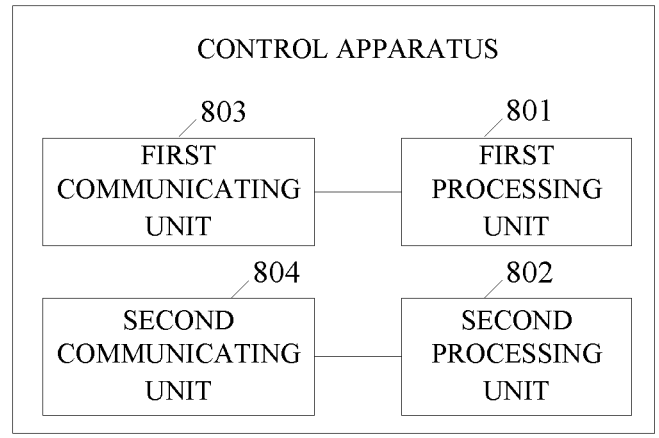
FIG. 8 is a schematic structural diagram illustrating a control apparatus according to an implementation of the present disclosure.

FIG. 8 is a schematic structural diagram illustrating a control apparatus according to an implementation of the present disclosure. The control apparatus is applicable to the wearable apparatus mentioned above. The wearable apparatus is coupled with an electronic apparatus. As illustrated in FIG. 8, the control apparatus includes a first processing unit 801, a second processing unit 802, a first communicating unit 803, and a second communicating unit 804. The first processing unit 801 and the first communicating unit 803 are applicable to a first wearable device. The second processing unit 802 and the second communicating unit 804 are applicable to a second wearable device. The first processing unit 801 is configured to send, via the first communicating unit 803, a first control instruction to the electronic apparatus, whereby the electronic apparatus executes the first control instruction. The second processing unit 802 is configured to send, via the second communicating unit 804, a second control instruction to the electronic apparatus, whereby the electronic apparatus executes the second control instruction.

In one implementation, the first processing unit 801 configured to send the first control instruction to the electronic apparatus configured to send the first control instruction to the electronic apparatus via the first communicating unit 803 is configured to receive a first input on the first wearable device from a user via at least one sensor of the first wearable device, and to send the first control instruction in response to the first input. The second processing unit 802 configured to send the second control instruction to the electronic apparatus configured to send the second control instruction to the electronic apparatus via the second communicating unit 804 is configured to receive a second input on the second wearable device from the user via at least one sensor of the second wearable device, and to send the second control instruction in response to the second input.

In one implementation, the first control instruction and the second control instruction are configured to instruct the electronic apparatus to control different applications of the electronic apparatus, where the different applications include a first application and a second application.

In one implementation, the first control instruction is configured to instruct the electronic apparatus to control a preset function of the first application, and the second control instruction is configured to instruct the electronic apparatus to control the preset function of the second application.

In one implementation, the first control instruction is configured to instruct the electronic apparatus to control a first function of the first application, and the second control instruction is configured to instruct the electronic apparatus to control a second function of the second application.

In one implementation, the first control instruction and the second control instruction are configured to instruct the electronic apparatus to control an application of the electronic apparatus.

In one implementation, the first control instruction and the second control instruction are configured to instruct the electronic apparatus to control the same function of the application.

In one implementation, the first control instruction is configured to instruct the electronic apparatus to control a first function of the application, and the second control instruction is configured to instruct the electronic apparatus to control a second function of the application.

It is to be noted that, the wearable apparatus described herein is presented in the form of functional units. The term "unit" used herein should be understood as the broadest meaning as possible, and an object for implementing functions defined by each "unit" may be, for example, an application-specific integrated circuit (ASIC), a single circuit, a processor (shared, dedicated, or chipset) and a memory for executing one or more software or firmware programs, a combinational logic circuit, and/or other suitable assemblies that can achieve the above described functions.

In one implementation, the first processing unit 801 is a control circuit of the first wearable device and the first communicating unit 803 is an input-output circuit of the first wearable device. The second processing unit 802 is a control circuit of the second wearable device and the second communicating unit 804 is an input-output circuit of the second wearable device.

Figure 9:
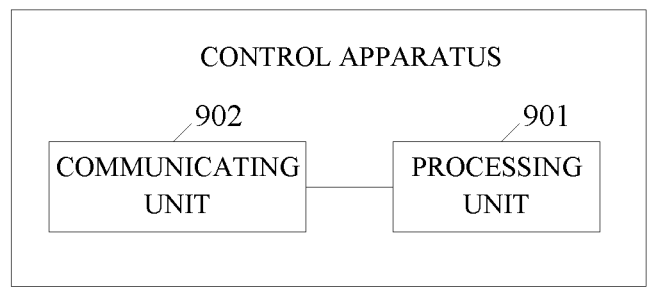
FIG. 9 is a schematic structural diagram illustrating another control apparatus according to an implementation of the present disclosure.

FIG. 9 is a schematic structural diagram illustrating a control apparatus according to an implementation of the present disclosure. The control apparatus is applicable to the foregoing electronic apparatus. The electronic apparatus is coupled with a wearable apparatus. The wearable apparatus includes a first wearable device and a second wearable device. As illustrated in FIG. 9, the control apparatus includes a processing unit 901 and a communicating unit 902. The processing unit 901 is configured to receive, via the communicating unit 902, a first control instruction from the first wearable device and to execute the first control instruction. The processing unit 901 is configured to receive, via the communicating unit 902, a second control instruction from the second wearable device and to execute the second control instruction.

In one implementation, different applications of the electronic apparatus or a same application of the electronic apparatus are controlled according to the first control instruction and the second control instruction, the disclosure will not elaborate herein, and reference can be made to the description of the foregoing electronic apparatus implementations.

It should be noted that, the wearable apparatus described in the implementations of the disclosure is presented in the form of functional units. The term "unit" used herein should be understood as the broadest meaning as possible, and an object for implementing functions defined by each "unit" may be, for example, an application-specific integrated circuit (ASIC), a single circuit, a processor (shared, dedicated, or chipset) and a memory for executing one or more software or firmware programs, a combinational logic circuit, and/or other suitable assemblies that can achieve the above described functions.

In one implementation, the processing unit 901 is a control circuit of an electronic apparatus and the communicating unit 902 is an input-output circuit of the electronic apparatus.

Implementations of the present disclosure further provide a computer storage medium. The computer storage medium is configured to store computer programs for electronic data interchange. The computer programs are operable with a computer to execute all or part of the operations of any of the methods described in the foregoing method implementations. The computer may include a wearable apparatus or an electronic apparatus.

Implementations of the present disclosure further provide a computer program product. The computer program product includes a non-transitory computer readable storage medium configured to store computer programs. The computer programs are operable with a computer to execute all or part of the operations of any of the methods described in the foregoing method implementations. The computer program product may be a software installation package. The computer may include a wearable apparatus or an electronic apparatus.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be executed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or assemblies may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to execute all or part of the steps described in the various implementations of the present disclosure. The memory includes various medium capable of storing program codes, such as a universal serial bus (USB) flash disk, a read-only memory (ROM), a random-access memory (RAM), a removable hard disk, Disk, compact disc (CD), or the like.

It will be understood by those of ordinary skill in the art that all or part of the steps of the various methods of the implementations described above may be accomplished by means of a program to instruct associated hardware, the program may be stored in a computer-readable memory, which may include a flash memory, a ROM, a RAM, Disk or CD, and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A wearable apparatus, comprising:
   a first wearable device and a second wearable device, the first wearable device and the second wearable device each comprising a control circuit, an input-output circuit, an acceleration sensor, an infrared proximity sensor, and a heart rate sensor, and the wearable apparatus being coupled with an electronic apparatus;
   the first wearable device being configured to start the infrared proximity sensor and the heart rate sensor of the first wearable device in response to detecting, by the acceleration sensor of the first wearable device, a put-in operation;
   the second wearable device being configured to start the infrared proximity sensor and the heart rate sensor of the second wearable device in response to detecting, by the acceleration sensor of the second wearable device, the put-in operation;
   the first wearable device being configured to determine that the first wearable device is in a wearing state, when the infrared proximity sensor of the first wearable device detects that the infrared proximity sensor is in a proximity state and heart rate detected by the heart rate sensor of the first wearable device in a time period is within a human heart rate range;
   the second wearable device being configured to determine that the second wearable device is in the wearing state, when the infrared proximity sensor of the second wearable device detects that the infrared proximity sensor is in the proximity state and heart rate detected by the heart rate sensor of the second wearable device in the time period is within the human heart rate range;
   the control circuit of the first wearable device being configured to control input-output circuit of the first wearable device and to send, via the input-output circuit of the first wearable device, a first control instruction to the electronic apparatus in response to a first input on the first wearable device when the first wearable device is in the wearing state, whereby the electronic apparatus executes the first control instruction to realize a first function;
   the control circuit of the second wearable device being configured to control input-output circuit of the second wearable device and to send, via the input-output circuit of the second wearable device, a second control instruction to the electronic apparatus in response to a second input on the second wearable device when the second wearable device is in the wearing state, whereby the electronic apparatus executes the second control instruction to realize a second function;
   wherein the first control instruction and the second control instruction are configured to instruct the electronic apparatus to control different applications of the electronic apparatus, wherein the different applications comprise a first application and a second application; and
   wherein the first function is a preset function of the first application and the second function is the preset function of the second application.

2. The wearable apparatus of claim 1, wherein input-output circuits of the first wearable device and the second wearable device of the wearable apparatus each comprise at least one sensor;
   wherein the control circuit of the first wearable device configured to send the first control instruction in response to the first input is configured to:
   receive the first input on the first wearable device from a user via at least one sensor of the first wearable device, and send the first control instruction in response to the first input; and
   wherein the control circuit of the second wearable device configured to send the second control instruction in response to the second input is configured to:
   receive the second input on the second wearable device from the user via at least one sensor of the second wearable device, and send the second control instruction in response to the second input.

3. A method of controlling a wearable apparatus, comprising: starting, by a first wearable device of the wearable apparatus, an infrared proximity sensor and a heart rate sensor of the first wearable device in response to detecting, by an acceleration sensor of the first wearable device, a put-in operation;
   starting, by a second wearable device of the wearable apparatus, an infrared proximity sensor and a heart rate sensor of the second wearable device in response to detecting, by an acceleration sensor of the second wearable device, the put-in operation;
   determining, by the first wearable device of the wearable apparatus, that the first wearable device is in a wearing state, when the infrared proximity sensor of the first wearable device detects that the infrared proximity sensor is in a proximity state and heart rate detected by the heart rate sensor of the first wearable device in a time period is within a human heart rate range;
   determining, by the second wearable device of the wearable apparatus, that the second wearable device is in the wearing state, when the infrared proximity sensor of the second wearable device detects that the infrared proximity sensor is in the proximity state and heart rate detected by the heart rate sensor of the second wearable device in the time period is within the human heart rate range;
   sending, by the first wearable device of the wearable apparatus, a first control instruction to an electronic apparatus in response to a first input on the first wearable device when the first wearable device is in the wearing state, whereby the electronic apparatus executes the first control instruction to realize a first function, the electronic apparatus being coupled with the wearable apparatus;

sending, by the second wearable device, a second control instruction to the electronic apparatus in response to a second input on the second wearable device when the second wearable device is in the wearing state, whereby the electronic apparatus executes the second control instruction to realize a second function; and wherein the first function and the second function are different functions of different applications.

4. The method of claim 3, wherein sending the first control instruction in response to the first input comprises:

receiving the first input on the first wearable device from a user via at least one sensor of the first wearable device, and sending the first control instruction in response to the first input; and sending the second control instruction in response to the second input comprises:

receiving the second input on the second wearable device from the user via at least one sensor of the second wearable device, and sending the second control instruction in response to the second input.

5. A non-transitory computer storage medium configured to store programs which, when executed by a wearable apparatus, causes the wearable apparatus to:

start an infrared proximity sensor and a heart rate sensor of a first wearable device of the wearable apparatus in response to detecting, by an acceleration sensor of the first wearable device, a put-in operation;

start an infrared proximity sensor and a heart rate sensor of a second wearable device of the wearable apparatus in response to detecting, by an acceleration sensor of the second wearable device, the put-in operation;

determine that the first wearable device is in a wearing state, when the infrared proximity sensor of the first wearable device detects that the infrared proximity sensor is in a proximity state and heart rate detected by the heart rate sensor of the first wearable device in a time period is within a human heart rate range;

determine that the second wearable device is in the wearing state, when the infrared proximity sensor of the second wearable device detects that the infrared proximity sensor is in the proximity state and heart rate detected by the heart rate sensor of the second wearable device in the time period is within the human heart rate range;

send a first control instruction to an electronic apparatus in response to a first input on the first wearable device when the first wearable device is in the wearing state, whereby the electronic apparatus executes the first control instruction to realize a first function, the electronic apparatus being coupled with the wearable apparatus;

send a second control instruction to the electronic apparatus in response to a second input on the second wearable device when the second wearable device is in the wearing state, whereby the electronic apparatus executes the second control instruction to realize a second function; and wherein the first function and the second function are the same function of different applications.

6. The non-transitory computer storage medium of claim 5, wherein the programs executed by the wearable apparatus to send the first control instruction in response to the first input are executed by the wearable apparatus to:

receive the first input on the first wearable device from a user via at least one sensor of the first wearable device, and send the first control instruction in response to the first input; and wherein the programs executed by the wearable apparatus to send the second control instruction in response to the second input are executed by the wearable apparatus to:

receive the second input on the second wearable device from the user via at least one sensor of the second wearable device, and send the second control instruction in response to the second input.

* * * * *